June 15, 1943.   H. F. BENNETT   2,321,973
TELEPHOTO OBJECTIVE
Filed Aug. 28, 1941
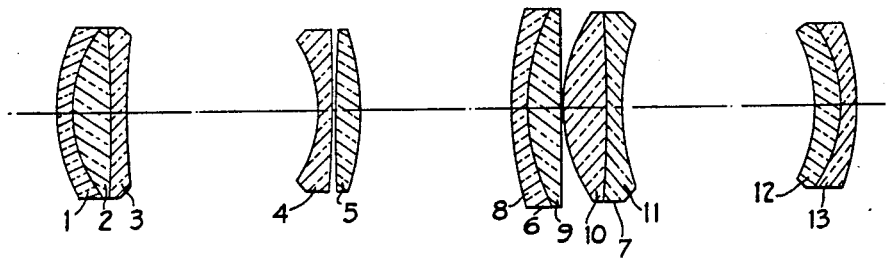
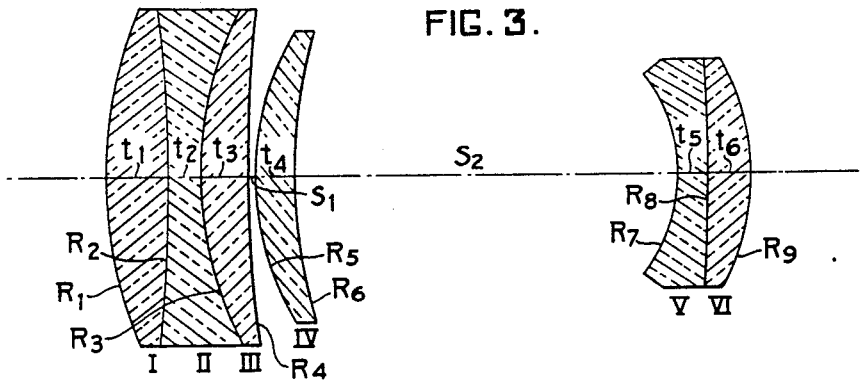
| EF = 100 mm | | | | f 4.0 |
|---|---|---|---|---|
| LENS | $N_D$ | V | RADII | THICKNESSES |
| I | 1.572 | 42.5 | $R_1 = +31.2$ mm | $t_1 = 4.9$ mm. |
| II | 1.689 | 30.9 | $R_2 = -94.0$ | $t_2 = 2.6$ |
| III | 1.532 | 48.9 | $R_3 = +28.4$ | $t_3 = 3.6$ |
|  |  |  | $R_4 = +136.0$ | $S_1 = 0.4$ |
| IV | 1.517 | 64.5 | $R_5 = +22.2$ | $t_4 = 2.8$ |
|  |  |  | $R_6 = +36.5$ | $S_2 = 29.4$ |
| V | 1.697 | 56.1 | $R_7 = -12.6$ | $t_5 = 1.9$ |
| VI | 1.575 | 41.4 | $R_8 = -567.0$ | $t_6 = 3.3$ |
|  |  |  | $R_9 = -18.3$ | BF = 31.6 |
HAROLD F. BENNETT
INVENTOR
BY
ATTORNEY Patented June 15, 1943

2,321,973

UNITED STATES PATENT OFFICE 2,321,973

TELEPHOTO OBJECTIVE

Harold F. Bennett, Rochester, N. Y., assignor to Eastman Kodak Company, Rochester, N. Y., a corporation of New Jersey Application August 28, 1941, Serial No. 408,637

9 Claims. (Cl. 88—57)

This invention relates to photographic objectives and particularly to telephoto objectives.

It is an object of the invention to provide a telephoto objective with large aperture and with reduced over-correction of the Petzval sum.

It is a particular object of the invention to provide a large aperture telephoto objective with anastigmatic flattening of the image field.

Telephoto lenses have a tendency to over-correction of the Petzval sum, particularly in the types in which the equivalent focal length of the dispersive or negative member is about as short as or shorter than that of the collective or positive member. I have found that this over-correction of the Petzval sum tends to be worse in cases where the focal length of the collective member is shorter in comparison with the focal length of the objective. It also tends to be worse as the optical separation of the two members deviates in either direction from a value which is roughly one-half the focal length of the positive member, the focal length of the objective and the total length from the front surface of the front member to the focal plane of the objective being held substantially constant by varying the respective focal lengths of the two members.

Heretofore it has been a common practice to avoid such an over-correction of the Petzval sum by designing telephoto lenses such that the focal length of the rear member is longer than that of the front member. In cases where the conditions of mounting and coverage of angular field in the camera precluded the use of telephoto lenses of the latter type, it has been common practice to counteract the backward Petzval curvature by inward astigmatism, thus obtaining a flat field which suffers from undesirable astigmatism.

According to the present invention the undesirable over-correction of the Petzval sum is reduced or entirely removed. This is done primarily by making the front member of more than two elements such that one of the elements differs in sign and differs by more than 0.05 in refractive index from each of two other elements of the front member. These three elements may consist of two negative elements of high index and one positive element of lower index, but preferably consist of two positive elements of low index and one negative element of higher index.

Also according to the invention a positive element of the front member is cemented to the back of a negative element whose index of refraction exceeds that of the positive element by more than 0.05. There was a time in their development when telephoto lenses were occasionally designed so that a positive element was cemented to the back of a negative element in the front member. In later years this form was generally abandoned as it was found less desirable than the more common form with a positive element cemented to the front of a negative element of higher index. I have found, however, that this arrangement of a positive element cemented behind a negative element reduces the over-correction of the Petzval sum without over-correcting the spherical aberration at the same time. This can be done because a cemented surface with negative power in the front member has less overcorrecting effect on the spherical aberration if it is concave toward the rear than if it is concave toward the front. In fact it can even have a small undercorrecting effect.

There are certain known types of lens systems consisting of a positive and a negative member in which the characteristics of the elements of the positive member are apparently similar to those described here, but those which have such outward resemblance do not have the large index differences which are of the essence of this invention.

In telephoto lenses of the type to which this invention relates, it is usually undesirable to increase the power and lower the index of the positive or collective lens elements in the system while increasing the power and raising the index of the negative elements because of the resulting increased tendency to overcorrection of spherical aberration in the dispersive cemented surface or surfaces in the front member. This difficulty is not marked in systems in which the negative member is somewhat weaker than the positive member; that is, the focal length of the negative member is longer than that of the positive member by about 5% or more. Similarly it is not marked in systems in which the negative member is separated from the rear principal point of the positive member by more than about 85% of the focal length of the positive member, nor in systems in which the negative member is plano-concave or bi-concave in shape. In these cases the negative member tends to overcorrect the spherical aberration less strongly on account of its weaker power, its position, or its shape respectively.

In still other systems the tendency to over-correction of the spherical aberration is counteracted by spacing the components of one of the two members of the lens system a considerable distance apart.

None of these expedients, however, permits a flat field or wide coverage or convenient size for mounting.

In telephoto ojectives according to the invention the negative member is separated from the rear principal point of the front positive member by more than the axial thickness of either member and by less than 0.85 times the focal length of the front member, the rear member is meniscus in outward form, and the focal length of the rear member is numerically less than 1.05 times the focal length of the front member.

By meniscus in outward form is meant that the surfaces respectively nearest and farthest from the other member are concave in the same direction whether or not any air spaces are included therebetween.

According to one feature of a preferred embodiment of the invention the chromatic aberration also is corrected and the undesirable over-correction of the Petzval sum is reduced simultaneously by making the elements of the front member of glass such that there is a relatively small difference between the dispersive indices of the negative and the positive elements. I have found that this difference tends to be smaller in the type of telephoto objective having a single component in the front member than in the types having more than one component.

Where V and N are the usual dispersive and refractive indices respectively, the sums $(V+60N)$ in the case of the positive elements and $(V+20N)$ in the case of the negative elements of the front member are more accurately expressive of the effect on chromatic correction than the simple dispersive index V if the changes in powers and curves sufficient substantially to maintain the same spherical aberration and coma are taken into account. For example in the form of the invention in which the foremost element is positive, the second element is negative, and the two are cemented together, within the range of available glass $N_I$ may have any value less than $(N_{II}-0.05)$, where $N_I$ and $N_{II}$ are the refractive indices of the foremost and the second elements respectively. If $N_I$ of a corrected lens is raised but still within this range a decrease in the curvature of the front surface and an increase in the numerical value of the dioptric power of the first and second elements can be found that will restore the coma and spherical aberration. This increase in dioptric power requires a decrease in the dispersive index $V_I$ of the positive element in order to maintain the chromatic correction of the objective, and I have found that the decrease in $V_I$ must be approximately sixty times the increase in $N_I$. Therefore $(V_I+60N_I)$ instead of $V_I$ is taken as a measure of the chromatic effect of this positive element and similarly $(V_{II}+20N_{II})$ instead of $V_{II}$ for the negative element.

In an objective made according to this embodiment of the invention with a front member consisting of a single component, it is preferred that three elements of the front component including at least one of each sign should be made of glass such that the sum $(V+60N)$ for each positive element should exceed the sum of $(V+20N)$ for each negative element (at least on the average for both cemented surfaces) by less than 78.

Likewise in an objective made according to this embodiment of the invention with a front member consisting of more than one component it is preferred that these sums should differ on the average by less than 85.

In objectives in which the front member comprises more than three elements, it is not necessary that the three elements meeting the requirements in regard to chromatic effect should be the identical three elements which meet the requirement in regard to refractive index.

In a more preferred form of the invention a positive element is cemented between two negative elements or, still more preferably, a negative element between two positive elements. In the most preferred form of the invention the front member consists of such a triplet and one other component.

It is a common practice in the design of lens systems of various types including telephotos to divide between two components the collective power which was previously found in one component. This is done to reduce the spherical aberration or more particularly to reduce the zonal spherical aberration so as to make practical the use of larger relative apertures or wider angular fields or both. The present invention combines favorably with this feature to produce large aperture telephoto lenses, whether the elements by which the invention is specifically carried out are all in one component or not. For example a preferred form has a positive element, a negative element and a positive element cemented in that order followed by a spaced positive element incorporating part of the power which would otherwise be in the rear element of the three cemented ones.

Although the invention lies primarily in the structure of the front member, I have found certain structural features of the rear member to be of advantage. In fact these features alone reduce the over-correction of the Petzval sum in a novel manner.

In carrying out this feature of the invention a positive element and a higher index negative element conforming to certain relations between dispersive and refractive indices and with a considerably greater difference in refractive index than heretofore used are combined in the rear member effectively to reduce the over-correction of the Petzval sum. The dispersive and refractive indices conform to the relation that the sum $(V+200N)$ for the negative element exceeds a like sum for the positive element by more than 24, or by at least 28 if this feature alone is used to reduce the Petzval over-correction. In addition the refractive index of the negative element exceeds that of the positive element by more than 0.03, preferably by at least 0.05 if this feature is used alone.

Preferably these two elements constitute the entire rear member. It is also preferable that the rear member be cemented together in one component. Thus the most preferred form of the invention, in addition to the features of the front member already described, has a rear member which embodies these features.

In a preferred embodiment, it is also an advantage in correcting lateral chromatic aberration so to choose the glasses of which the front member is made that the dispersive index of the first positive element is less than that of at least one other positive element of the front member.

In the accompanying drawing:

Fig. 1 shows an embodiment of the invention with a triplet only for the front member and spaced elements for the rear member.

Fig. 2 shows a different embodiment with two doublets for the front member.

Fig. 3 shows a preferred form of the invention a triplet and a single element forming the front member.

Fig. 4 shows the data for one embodiment of the lens shown in Fig. 3 according to the most preferred form of the invention.

Fig. 1 shows an f/5.6 objective, of which the front member consists of three lens elements, 1, 2, and 3, cemented together. Element 2 is positive and is between two negative elements, 1 and 3, each of which has a refractive index more than 0.05 higher than that of the positive element 2 in accordance with one form of the invention. The rear member consists of a negative element 4 and a positive element 5 spaced behind it. The refractive and dispersive indices respectively are 1.620 and 60.3 for element 4 and 1.541 and 47.2 for element 5. The sum of the dispersive index plus two hundred times the refractive index is 384 for element 4 and 355 for element 5, the former exceeding the latter by more than 24 in accordance with one feature of the invention. Alternatively the front component may be replaced by a triplet of the form shown in Fig. 3.

Fig. 2 shows an f/4.0 telephoto objective of which the front member consists of two cemented doublets, 6 and 7, the front doublet 6 consisting of a negative element 8 cemented to the front of a positive element 9, according to the invention and the doublet 7 consists of a positive element 10 cemented to the front of a negative element 11. In one embodiment of this type objective the refractive indices are 1.620, 1.532, 1.501, and 1.620, for elements 8 to 11 respectively. Any three of these elements thus have the features of the invention correlating the indices of refraction of the elements of the front member.

The rear member is a cemented doublet consisting of a positive element 12 cemented to the front of a negative element 13. In element 12, N is 1.582, V is 42.0, and (V+200N) is 358, where N is the refractive index and V is the dispersive index. In element 13, N is 1.620, V is 60.3, and (V+200N) is 384 which exceeds 358 by more than 24 in accordance with the corresponding feature of the invention.

The preferred and most useful form of the invention is however shown in Fig. 3 and complete data for one example of this form are given in the table in Fig. 4.

Fig. 3 shows an f/4.0 objective of 100 mm. focal length which in its preferred form has the following characteristics:

| Figures 3 and 4 | | f/4.0 | f=100 mm. |
|---|---|---|---|
| Lens | $N_d$ | V | Radii | Thicknesses |
| I | 1.572 | 42.5 | $R_1=+31.2$ mm. | $t_1=4.9$ mm. |
| II | 1.689 | 30.9 | $R_2=-94.0$ | $t_2=2.6$ |
| III | 1.532 | 48.9 | $R_3=+28.4$ | $t_3=3.6$ |
|  |  |  | $R_4=+136.0$ | $S_1=0.4$ |
| IV | 1.517 | 64.5 | $R_5=+22.2$ | $t_4=2.8$ |
|  |  |  | $R_6=+36.5$ | $S_2=29.4$ |
| V | 1.697 | 56.1 | $R_7=-12.6$ | $t_5=1.9$ |
| VI | 1.575 | 41.4 | $R_8=-567.0$ | $t_6=3.3$ |
|  |  |  | $R_9=-18.3$ | BF=31.6 |

In this objective the front member consists of two components, one of which is a single element and the other is a triplet consisting of a negative element cemented between two positive elements whose respective indices are 0.117 and 0.157 lower than that of the negative element. The chromatic effect as given by the sum of (V+60N) is 137 and 141 respectively for the positive elements which both differ by less than 78 from the sum of (V+20N) which is 65 for the negative element.

In this Fig. 3, $R_3$ is the cemented boundary important to the invention between a negative element and a positive element.

The rear member consists of a negative and a positive element cemented together in which the index of refraction differs by more than 0.05 and the sum of V+200N which is 395 and 356 respectively for the two elements differs by more than 28.

Since the two members of these or, for that matter, of practically any telephoto objectives operate independently relative to the aberrations, the rear members of any of the embodiments shown may be interchanged.

Having thus described and explained my invention, I wish to point out that it is not limited to the structure shown but is of the scope of the appended claims.

What I claim and desire to secure by Letters Patent of the United States is:

1. A telephoto objective consisting of a front positive member comprising more than two elements, at least one of each sign, and a rear negative member meniscus in outward form spaced from the rear principal point of the front member by more than the axial thickness of either member and by less than 0.85 times the focal length of the front member, the focal length of the rear member being numerically less than 1.05 times the focal length of the front member, characterized that in three elements of the front member including at least one of each sign a negative element is cemented onto the front of a positive element and the refractive index of each negative element exceeds that of each positive element by more than 0.05.

2. A telephoto objective according to claim 1 further characterized that in three elements of the front member including at least one of each sign the sum of the dispersive index plus sixty times the refractive index of each positive element exceeds the sum of the dispersive index plus twenty times the refractive index of each negative element on the average by less than 78.

3. A telephoto objective according to claim 1 in which the front member consists of a plurality of components each pair of adjacent components enclosing an air lens, characterized by the feature that in three elements of the front member including at least one of each sign the sum of the dispersive index plus sixty times the refractive index for each positive element exceeds the sum of the dispersive index plus twenty times the refractive index for each of the negative elements on the average by less than 85.

4. A telephoto objective according to claim 1 in the front member of which an element is cemented between two of the opposite sign.

5. A telephoto objective according to claim 1 characterized by the feature that in the front member a negative element is cemented between two positive elements.

6. A telephoto objective consisting of a front positive member comprising more than two elements and a rear negative member comprising a negative and a positive element and characterized by the features that in three elements of the front member including at least one of each sign a negative element is cemented onto the front of a positive element and the refractive index of each negative element exceeds that of each positive element by more than 0.05 and that the refractive index of said negative element of the rear member exceeds by more than 0.03 the index of said positive element of the rear member while the sum of the dispersive index plus two hundred times the refractive index of said negative element of the rear member exceeds by more than 24 the like sum for said positive element of the rear member.

7. A telephoto objective consisting of a front positive member and a rear negative member, said front member consisting of two components enclosing an air lens, one of said components consisting of a negative element cemented between two positive elements, the refractive index of said negative element exceeding that of each of two positive elements of the front member by more than 0.05 while the sum of the dispersive index plus twenty times the refractive index of said negative element is less than the sum of the average dispersive index plus sixty times the average refractive index of two positive elements of the front member by less than 85, and said rear member comprising a negative element and a positive element the refractive index of said negative element exceeding that of said positive element by more than 0.03 while the sum of the dispersive index plus two hundred times the refractive index of said negative element of the rear member exceeds the like sum for said positive element by more than 24.

8. An objective according to claim 7 in which the front positive element of the front member has a dispersive index smaller than that of at least one of the other positive elements of the front member.

9. In a telephoto objective system consisting of a front compound collective member and a rear dispersive member, a rear member comprising a negative element and a positive element such that the refractive index of the negative element exceeds that of the positive element by at least 0.05 and the sum of the dispersive index plus two hundred times the refractive index of the negative element exceeds the sum of the dispersive index plus two hundred times the refractive index of the positive element by at least 28.

HAROLD F. BENNETT.